United States Patent
Aoyama

(10) Patent No.: US 6,667,358 B1
(45) Date of Patent: Dec. 23, 2003

(54) FLAME RETARDANT RESIN COMPOSITION

(75) Inventor: Masataka Aoyama, Ichihara (JP)

(73) Assignee: DuPont-Mitsui Polychemicals Co., Tokyo (JP)

( * ) Notice: Subject to any disclaimer, the term of this patent is extended or adjusted under 35 U.S.C. 154(b) by 0 days.

(21) Appl. No.: 09/743,864

(22) PCT Filed: May 16, 2000

(86) PCT No.: PCT/JP00/03140

§ 371 (c)(1),
(2), (4) Date: Jan. 17, 2001

(87) PCT Pub. No.: WO00/69961

PCT Pub. Date: Nov. 23, 2000

(30) Foreign Application Priority Data

| | | |
|---|---|---|
| May 17, 1999 | (JP) | 11-135234 |
| Oct. 15, 1999 | (JP) | 11-293648 |
| Dec. 7, 1999 | (JP) | 11-347326 |
| Feb. 2, 2000 | (JP) | 2000-024902 |

(51) Int. Cl.⁷ .................................................. C08K 3/22
(52) U.S. Cl. ....................... 524/436; 523/206; 524/401; 524/413; 524/424; 524/425; 524/437; 524/444; 524/450
(58) Field of Search .................... 524/413, 425, 524/401, 424, 436, 437, 444, 450; 523/206

(56) References Cited

U.S. PATENT DOCUMENTS

| | | | |
|---|---|---|---|
| 4,407,992 A | * 10/1983 | Keogh | 524/94 |
| 4,845,146 A | * 7/1989 | Inoue et al. | 524/436 |
| 5,002,996 A | * 3/1991 | Okuda et al. | 524/436 |
| 5,025,042 A | * 6/1991 | Yoshida et al. | 523/216 |
| 5,057,367 A | * 10/1991 | Morii et al. | 428/389 |
| 5,091,453 A | * 2/1992 | Davidson et al. | 524/269 |
| 5,286,775 A | * 2/1994 | Bandyopadhyay | 524/416 |
| 5,418,272 A | * 5/1995 | Kawabata et al. | 524/436 |
| 5,482,990 A | * 1/1996 | Jow et al. | 524/436 |
| 6,130,282 A | * 10/2000 | Imahashi et al. | 524/436 |
| 6,291,570 B1 | * 9/2001 | Katsuki et al. | 524/434 |

\* cited by examiner

*Primary Examiner*—Judy M. Reddick
(74) *Attorney, Agent, or Firm*—Sherman & Shalloway

(57) ABSTRACT

An olefin-type flame-retardant resin composition having excellent mechanical strength, abrasion resistance and workability, and exhibiting excellent flame-retardant properties and shell-forming properties when it has burned, despite the resin composition is blended with an inorganic compound. The composition contains 25 to 250 parts by weight of (D) a flame-retardant inorganic compound per 100 parts by weight of a base resin composition containing 95 to 5% by weight of (A) a copolymer of an ethylene and a vinyl acetate or other polar group-containing monomer, (B) 5 to 95% by weight of a copolymer of an olefin and an unsaturated carboxylic acid ester or other polar group-containing monomer, and 0 to 49% by weight of (C) a thermoplastic resin other than the above copolymers.

15 Claims, No Drawings

FLAME RETARDANT RESIN COMPOSITION

TECHNICAL FIELD

The present invention relates to an olefin-type flame-retardant resin composition. More specifically, the invention relates to a flame-retardant resin composition which exhibits excellent mechanical strength, abrasion resistance and processibility despite it is blended with an inorganic compound, and exhibits an excellent shell-forming property when it is burned.

BACKGROUND ART

Olefin-type polymers have been widely used as electric insulating materials owing to their excellent electric properties, mechanical properties and processibility. In particular, materials exhibiting well-balanced strength, low-temperature properties, abrasion resistance and hardness are required for the electric wires and cables, and an ethylene/unsaturated ester random copolymer having such properties has been widely used.

However, the ethylene-type copolymer easily burns and must, hence, be treated to be flame-retardant when it is to be used as an electric insulating material. It has been known to blend the ethylene-type copolymer with an inorganic compound to make it flame-retardant. To obtain a sufficient degree of flame-retardant effect, the inorganic compound must be blended in large amounts which, however, results in spoiling the processibility and mechanical properties inherent in the ethylene-type copolymer.

To avoid such a problem, it has been attempted to treat the surface of the inorganic compound with which the ethylene-type copolymer is blended and to add a modified resin grafted with an unsaturated carboxylic acid such as maleic acid. When the surface of the inorganic compound is treated, the mechanical strength is improved but the abrasion resistance is not improved. When the acid-modified resin is blended, the mechanical strength and abrasion resistance are improved causing, the processibility to be greatly deteriorated.

A method has also been known to blend antimony oxide and a halide. In case fire breaks out, however, the composition is likely to generate toxic gas, which is not desirable.

Japanese Examined Patent Publication (Kokoku) No. 103273/1995 teaches a self-fire-extinguishing copolymer composition containing 0.02 to 25 parts by weight of a copolymer (without containing epoxy group) of an ethylene and at least one kind of monomer selected from an unsaturated carboxylic acid, a derivative thereof and a vinyl ester, and 0.001 to 3 parts by weight of a copolymer of an ethylene containing 0.5 to 50% by weight of an ethylenically unsaturated epoxylated compound and an ethylenically unsaturated epoxy compound per 100 parts by weight of the total amount of 70 to 20% by weight of an olefin polymer resin and/or an elastomer, and 30 to 80% by weight of a hydroxide of aluminum and/or magnesium or a blend thereof with not more than 30% by weight of magnesium carbonate. The above composition, however, has the object of suppressing the tendency of becoming white and improving the anti-freezing property without impairing abrasion resistance, but never suggests the flame-retardant resin composition having excellent mechanical strength, abrasion resistance, processibility and shell-forming property when burned, which is contemplated by the present invention.

SUMMARY OF INVENTION

It is therefore an object of the present invention to provide an olefin-type flame-retardant resin composition having excellent mechanical strength, abrasion resistance and processibility despite it is blended with an inorganic compound, and further exhibiting excellent flame-retardant property and shell-forming property when it is burned.

The shell-forming property when it is burned referred to in the present invention, stands for a property that forms a shell or a formed shell itself is hard as observing the burned state by eyes. Those compositions that melt and drip without forming shell cannot be regarded to have excellent shell-forming property.

According to the present invention, there is provided a flame-retardant resin composition which contains 25 to 250 parts by weight of (D) a flame-retardant inorganic compound per 100 parts by weight of a base resin composition containing 95 to 5% by weight of (A) a copolymer of an ethylene and a vinyl acetate and optionally other polar group-containing monomer, (B) 5 to 95% by weight of a copolymer of an olefin and an unsaturated carboxylic acid ester and optionally other polar group-containing monomer, and 0 to 49% by weight of (C) a thermoplastic resin other than the above copolymers.

In the flame-retardant resin composition of the present invention, it is desired that:

1. The copolymer (A) contains 20 to 98% by weight of an ethylene, 2 to 80% by weight of a vinyl acetate, and 0 to 40% by weight of the other polar group-containing monomer;
2. The other polar group-containing monomer in the copolymer (A) is an unsaturated carboxylic acid or a derivative thereof, carbon monoxide or a vinyl alcohol;
3. The copolymer (A) has a melt flow rate (MFR), at 190° C. under a load of 2160 g, of from 0.1 to 100 g/10 minutes;
4. The copolymer (B) contains 20 to 98% by weight of an ethylene, 2 to 80% by weight of an unsaturated carboxylic acid ester, and 0 to 60% by weight of other polar group-containing monomer;
5. The other polar group-containing monomer in the copolymer (B) is an unsaturated carboxylic acid, an anhydride thereof, a glycidyl ester thereof, a (meth) acrylonitrile, or carbon monoxide;
6. The copolymer (B) contains from 0.1 to 10% by weight of a butadiene, from 5 to 50% by weight of an unsaturated carboxylic acid ester, and from 40 to 95% by weight of a (meth)acrylonitrile;
7. The copolymer (B) has a melt flow rate (MFR), at 190° C. under a load of 2160 g, of from 0.1 to 100 g/10 minutes;
8. The thermoplastic resin (C) is an ethylene-type polymer other than the copolymer (A) and the copolymer (B);
9. The ethylene-type polymer is an ethylene-type polymer modified with an unsaturated carboxylic acid, a straight chain ethylene/α-olefin copolymer, an ethylene/vinyl alcohol copolymer, or an aromatic group-containing ethylene-type copolymer; and
10. The flame-retardant inorganic compound (D) is a magnesium hydroxide, an aluminum hydroxide, a hydrotalcite-type complex hydroxide, basic magnesium carbonate or at least the one of the products thereof obtained by treating the surfaces with a fatty acid amide, a fatty acid salt, a fatty acid ester, a titanium coupling agent or a silane coupling agent.

The present invention further provides a flame-retardant resin composition comprising, as an essential component, an ethylene copolymer selected from:

(1) A parts by weight of an ethylene/vinyl acetate copolymer containing a mole % of a vinyl acetate, (2) B parts by weight of an ethylene/alkyl ester of unsaturated carboxylic acid copolymer containing b mole % of an alkyl ester of unsaturated carboxylic acid and c mole % of other polar monomer (where c may be 0), and (3) C parts by weight of an ethylene/vinyl acetate/alkyl ester of unsaturated carboxylic acid copolymer containing d mole % of a vinyl acetate, e mole % of an alkyl ester of unsaturated carboxylic acid and f mole % of other polar monomer (where f may be 0);

and optionally comprising:

(4) D parts by weight of an ethylene/polar monomer copolymer containing g mole % of other polar monomer and h mole % of a vinyl acetate (where h may be 0), and/or (5) E parts by weight of an aromatic group-containing copolymer containing i mole % of an aromatic group-containing monomer, the following ratio:

$(bB+eC)/(bB+eC+aA+dC+hD)$ being from 0.01 to 0.99, and said flame-retardant resin composition containing from 25 to 250 parts by weight of a flame-retardant inorganic compound per 100 parts by weight of the total amount of the copolymers (1) to (5).

In the flame-retardant resin composition of this embodiment, it is desired that:

1. The following ratio, $(cB+fC+gD+iE)/100$ is in a range of not larger than 49; and 2. b is larger than a, A is present in a range of from 60 to 95 parts by weight, and B is present in a range of from 40 to 5 parts by weight (the total of the two is 100 parts by weight).

According to the present invention, there is further provided a flame-retardant resin composition comprising:

(1) B parts by weight of an olefin/alkyl ester of unsaturated carboxylic acid copolymer containing b mole % of an alkyl ester of unsaturated carboxylic acid and c mole % of other polar monomer, and (2) A parts by weight of an ethylene/vinyl acetate copolymer containing a mole % of a vinyl acetate and c' mole % of other polar monomer:

and further containing from 25 to 250 parts by weight of a flame-retardant inorganic compound per 100 parts by weight of the copolymer components satisfying the following formula, $(A)/(B)=5/95$ to $95/5$, $bB/(bB+aA)=0.01$ to $0.99$, and $(cB+c'A)/100=0.01$ to $49$ (where either c or c' may be zero).

DETAILED DESCRIPTION OF INVENTION

The present invention has a feature in the use of (A) a copolymer of an ethylene and a vinyl acetate and optionally other polar group-containing monomer and (B) a copolymer of an olefin and an unsaturated carboxylic acid ester and optionally other polar group-containing monomer in combination at a predetermined ratio, and, further containing (D) a flame-retardant inorganic compound. This makes it possible to improve mechanical strength and abrasion resistance of the molded article and, further, to enhance the flame-retarding property as compared with a resin composition obtained by blending either one of the above copolymer with the flame-retarding inorganic compound.

Resin molded articles blended with large amounts of a flame-retardant inorganic compound, in general, exhibit improved flame-retardant property with accompanied, however, by a decrease in the abrasion resistance.

The degree of abrasion resistance can be evaluated in terms of a taper wear. That is, the resin composition obtained by blending either one of the copolymers with the flame-retardant inorganic compound (see Comparative Examples 1 and 2 appearing later) permits the taper wear to exceed 200 mg/1000 times, whereas the resin composition of the present invention suppresses the taper wear to be not larger than 140 mg/1000 times as demonstrated by Examples appearing later.

Further, the flame-retardant property of the resin composition is generally evaluated in terms of an oxygen index. The resin composition is more flame retardant when the oxygen index is large. A resin composition obtained by blending either one of the copolymers with the flame-retardant inorganic compound exhibits an oxygen index of not larger than 25, whereas the resin composition of the present invention exhibits an oxygen index which is improved by more than two points as a result of simply using the resins in combination, which is an unexpected fact.

In the field of covering the electric wires, it is desired that a fire-proof shell is formed after the covering resin composition has burned due to fire. The shell works to prevent short-circuit accident that results when the exposed electric conductors come in contact with each other. The resin composition obtained by blending an ethylene/vinyl acetate copolymer with a flame-retardant inorganic compound has poor heat resistance, tends to drip when burned and quite fails to form the shell, whereas the resin composition according to the present invention exhibits excellent heat resistance as well as excellent shell-forming property.

[Ethylene/Vinyl Acetate Copolymer]

The resin composition of the present invention contains, as one resin component, a copolymer (A) of an ethylene and a vinyl acetate and optionally other polar group-containing monomer. In the ethylene/vinyl acetate copolymer (A), the ethylene component is present in an amount of from 20 to 98% by weight, preferably, from 50 to 95% by weight, and the vinyl acetate component is present in an amount of from 2 to 80% by weight and, preferably, from 5 to 50% by weight.

The copolymer (A) may be copolymerized with a polar monomer component other than the vinyl acetate. The other polar monomer component may be a monomer other than the vinyl acetate and has a polar group containing such element as O, N, S or P.

Preferred examples of the polar group-containing monomer include unsaturated carboxylic acids such as acrylic acid, methacrylic acid, maleic acid, fumaric acid, itaconic acid, citraconic acid, as well as derivatives other than the alkyl ester, such as acid anhydrides, esters, amides, metal salts and, particularly, maleic anhydride, citraconic anhydride, itaconic anhydride, glycidyl acrylate, glycidyl methacrylate, and dicarboxylic acid half ester, such as monomethyl maleate and monoethyl maleate.

As the metal salt, there can be exemplified alkali metals such as sodium, potassium and lithium; alkaline earth metals such as magnesium and calcium; divalent metals such as zinc, copper, cobalt and nickel; and trivalent metals such as aluminum. The carboxylic acid can be neutralized with these metals such that the neutralization degree is not smaller than 0 and is 100 mol %.

There can be further exemplified carbon monoxide, a vinyl alcohol, an acrylonitrile and sulfur dioxide.

It is desired that the other polar monomer is contained in an amount of not larger than 40% by weight and, particularly, not larger than 30% by weight.

The ethylene/vinyl acetate copolymer (A) has a melt flow rate, at 190° C. under a load of 2160 g, of from 0.1 to 100 g/10 min. and, preferably, from 0.2 to 50 g/10 min.

The ethylene/vinyl acetate copolymer (A) can be obtained by radically copolymerizing an ethylene and a vinyl acetate and optionally other polar monomer at a high temperature and under an elevated pressure. Among the polar monomer components, a vinyl alcohol unit can be formed by saponifying a vinyl acetate unit. Further, the polar monomer component can be introduced into the copolymer even by the graft copolymerization in addition to the random polymerization.

[Olefin/Unsaturated Carboxylic Acid Ester Copolymer]

The resin composition of the present invention contains, as another resin component, a copolymer (B) of an olefin and an unsaturated carboxylic acid ester and optionally other polar group-containing monomer.

As the olefin in the copolymer (B), there can be exemplified aliphatic monoolefins such as ethylene, propylene, 1-butene, 1-hexene and 4-methyl-1-pentene; aliphatic diolefins such as butadiene and isoprene; and aromatic olefin such as styrene and α-methyl styrene.

As the alkyl ester of unsaturated carboxylic acid constituting the copolymer (B), it is desired to use an unsaturated carboxylic acid having 1 to 12 carbon atoms, such as (meth)acrylic acid, fumaric acid or maleic acid and, particularly, an alkyl ester having about 1 to about 8 carbon atoms. Here, (meth)acrylic acid stands for an acrylic acid or a methacrylic acid. More concretely, there can be exemplified methyl (meth)acrylate, ethyl (meth)acrylate, isopropyl (meth)acrylate, n-butyl (meth)acrylate, isobutyl (meth)acrylate, 2-ethylhexyl (meth)acrylate, dimethyl maleate and diethyl maleate.

The copolymer (B) may be copolymerized with polar monomer components other than the alkyl ester of unsaturated carboxylic acid and vinyl acetate. The polar monomer components are the monomers other than the alkyl ester of unsaturated carboxylic acid and vinyl acetate, and have a polar group containing such element as O, N, S or P.

Preferred examples of the polar group-containing monomer include unsaturated carboxylic acids such as acrylic acid, methacrylic acid, maleic acid, fumaric acid, itaconic acid, citraconic acid, as well as derivatives other than the alkyl ester, such as acid anhydrides, esters, amides, metal salts and, particularly, maleic anhydride, citraconic anhydride, itaconic anhydride, glycidyl acrylate, glycidyl methacrylate, and dicarboxylic acid half ester, such as monomethyl maleate and monoethyl maleate.

As the metal salt, there can be exemplified alkali metals such as sodium, potassium and lithium; alkaline earth metals such as magnesium and calcium; divalent metals such as zinc, copper, cobalt and nickel; and trivalent metals such as aluminum. The carboxylic acid can be neutralized such that the neutralization degree is not smaller than 0 and is not larger than 100 mol %.

As the polar group-containing monomer component, there can be further exemplified carbon monoxide, a vinyl alcohol, a (meth)acrylonitrile and sulfur dioxide.

It is desired that the other polar monomer is contained in an amount of not larger than 40% by weight and, particularly, not larger than 30% by weight.

A preferred copolymer (B) is the one in which the olefin is an ethylene. It is desired that the copolymer (B) contains an ethylene in an amount of from 20 to 98% by weight and, preferably, from 25 to 95% by weight, contains an alkyl ester of unsaturated carboxylic acid in an amount of from 2 to 80% by weight and, preferably, from 5 to 75% by weight, and contains other polar group-containing monomer in an amount of from 0 to 60% by weight and, preferably, from 0 to 30% by weight.

Another preferred copolymer (B) is the one obtained by copolymerizing a diene, an alkyl ester of unsaturated carboxylic acid and other polar monomer such as acrylonitrile. In this copolymer, it is desired that the alkyl ester of unsaturated carboxylic acid is contained in an amount of from 1 to 80 mol % and, particularly, from 2 to 60 mol %, and the other polar monomer is contained in an amount of from 1 to 95 mol % and, particularly, from 10 to 90 mol %. Most desirably, the copolymer contains the butadiene in an amount of from 0.1 to 10% by weight, contains the alkyl ester of unsaturated carboxylic acid in an amount of from 5 to 50% by weight, and contains the (meth)acrylonitrile in an amount of from 40 to 95% by weight.

There can be further exemplified a graft copolymer obtained by copolymerizing other polar monomer such as acrylonitrile and aromatic olefin such as styrene in the presence of the ethylene/alkyl ester of unsaturated carboxylic acid copolymer and the ethylene/alkyl ester of unsaturated carboxylic acid/maleic acid copolymer.

The copolymer (B) has a melt flow rate, at 190° C. under a load of 2160 g, of from 0.1 to 100 g/10 min. and, preferably, from 0.2 to 50 g/10 min.

The olefin/alkyl ester of unsaturated carboxylic acid copolymer (B), too, can be obtained by radically copolymerizing an olefin and an alkyl ester of unsaturated carboxylic acid and optionally other polar monomer at a high temperature and under an elevated pressure. Further, the polar monomer component can be introduced into the copolymer even by the graft copolymerization in addition to the random polymerization.

[Other Thermoplastic Resins]

The resin composition of the present invention can be blended with other thermoplastic resin (C) in addition to the above-mentioned copolymers (A) and (B).

As the thermoplastic resin (C), there can be suitably used an ethylene-type polymer other than the copolymers (A) and (B).

Suitable examples of the ethylene-type polymer include high-, intermediate- and low-density polyethylenes and an ethylene/α-olefin copolymer. The polyethylene may be the one produced by a high-pressure method, an intermediate-pressure method or a low-pressure method, or may be the one produced by any catalyst system. Particularly preferably, however, there is used a straight-chain ethylene/α-olefin copolymer (metallocene LLDPE) polymerized by using a metallocene catalyst.

Other preferred examples of the ethylene-type polymer include an ethylene/propylene copolymer, an ethylene/propylene/diene copolymer, as well as the ethylene-type copolymer containing the above-mentioned polar monomer, such as an ethylene/unsaturated carboxylic acid copolymer, an ethylene/vinyl alcohol copolymer and an acid-modified ethylene-type polymer. It is desired that the ethylene-type polymer contains the ethylene in an amount of not smaller than 30 mol % and contains the polar monomer in an amount of from 0.1 to 70 mol %.

Further examples of the ethylene-type polymer include aromatic group-containing copolymers that contain an ethylene unit. Desired examples include a styrene/ethylene-butene/styrene block copolymer (SEBS) obtained by the hydrogenation of an ethylene/styrene copolymer or of a styrene/butadiene/styrene block copolymer, a styrene/ethylene-propylene/styrene block copolymer (SEPS) obtained by the hydrogenation of a styrene/isoprene/styrene block copolymer, and a styrene/ethylene/ethylene-propylene/styrene block copolymer (SEEPS) obtained by the hydrogenation of a styrene/butadiene/isoprene/styrene copolymer. It is desired that these copolymers contain styrene units in an amount of from 2 to 55 mol %.

The above-mentioned aromatic group-containing copolymers exhibit excellent compatibility to the ethylene/vinyl acetate copolymer (A) and to the olefin/alkyl ester of unsaturated carboxylic acid copolymer (B).

It is desired that the thermoplastic resin (C) has an MFR, at 230° C. under a load of 2160 g, of, generally, from 0.1 to 100 g/10 min.

[Base Resin Composition]

The base resin used in the present invention contains, on the basis of the resin, 95 to 5% by weight and, particularly, 75 to 10% by weight of (A) the ethylene/vinyl acetate copolymer, 5 to 95% by weight and, particularly, 25 to 90% by weight of (B) the olefin/alkyl ester of unsaturated carboxylic acid copolymer, and 0 to 49% by weight and, particularly, 0 to 40% by weight of (C) the thermoplastic resin other than those copolymers described above.

When the mixing ratio of the ethylene/vinyl acetate copolymer (A) becomes smaller than the above range, the abrasion resistance of the resin composition blended with the inorganic compound tends to become inferior to that of when the mixing ratio lies within the above range. When the mixing ratio of the olefin/alkyl ester of unsaturated carboxylic acid copolymer (B) becomes smaller than the above range, further, the flame-retarding property and the shell-forming property tend to become lower than those of when the mixing ratio lies within the above range. Thus, either case is not desirable.

When the mixing ratio of the thermoplastic resin (C) exceeds the above range, the above-mentioned merit obtained by the use of the copolymers (A) and (B) in combination tends to be canceled, which is not desirable.

A preferred resin composition of the present invention comprises:

(1) A parts by weight of an ethylene/vinyl acetate copolymer containing a mole % of a vinyl acetate, (2) B parts by weight of an ethylene/alkyl ester of unsaturated carboxylic acid copolymer containing b mole % of an alkyl ester of unsaturated carboxylic acid and c mole % of other polar monomer (where c may be 0), and (3) C parts by weight of an ethylene/vinyl acetate/alkyl ester of unsaturated carboxylic acid copolymer containing d mole % of a vinyl acetate, e mole % of an alkyl ester of unsaturated carboxylic acid and f mole % of other polar monomer (where f may be 0);

and optionally comprising:

(4) D parts by weight of an ethylene/polar monomer copolymer containing g mole % of other polar monomer and h mole % of a vinyl acetate (where h may be 0), and/or (5) E parts by weight of an aromatic group-containing copolymer containing i mole % of an aromatic group-containing monomer, a value (X-value) defined by the following formula:

$$X=(bB+eC)/(bB+eC+aA+dC+hD)$$

being in a range of from 0.01 to 0.99, preferably, from 0.05 to 0.95 and, more preferably, from 0.1 to 0.7.

In the formula X, the denominator is the total amount (% by weight) of the alkyl ester of unsaturated carboxylic acid in the whole resin and of the vinyl acetate in the whole resin, and the numerator represents the amount (% by weight) of the alkyl ester of unsaturated carboxylic acid in the whole resin.

That is, when the value is too small, the flame-retarding property becomes poor and good shell-forming property is not obtained when burned, either. When the value is too large, on the other hand, the resin strength decreases and the flame-retarding property becomes poor. When the value lies within the above range, there are obtained excellent flame-retarding property, shell-forming property, resin strength and abrasion resistance in combination.

It is further desired that the composition is so prepared that the Y-value defined by the following formula, $$Y=(cB+fC+gD+iE)/100$$

is not larger than 49 and, particularly, not larger than 25.

The formula Y is to define the total amount (% by weight) of the other polar monomers and the aromatic monomer in the whole resin. That is, the polar monomer components other than the vinyl acetate and the alkyl ester of unsaturated carboxylic acid, work to further improve the shell-forming property and flexibility and enable the amount of the alkyl ester of unsaturated carboxylic acid to be decreased. When used in too large amounts, however, the polar monomer components impair the toughness and moldability. It is therefore desired that the polar monomer components are used in amounts without exceeding the above upper limit.

In order to utilize excellent properties of the ethylene/vinyl acetate copolymer as much as possible, it is natural to use (A) the ethylene/vinyl acetate copolymer and (B) the olefin/alkyl ester of unsaturated carboxylic acid copolymer in combination. Here, it is desired to use these copolymers in such amounts that b>a, preferably, b>a+1 and, more preferably, b>a+2.

When A+B is 100 parts by weight, it is desired to blend these copolymers at such a ratio that A is 60 to 95 parts by weight, and B is 40 to 5 parts by weight.

A further preferred resin composition of the present invention comprises:

(1) B parts by weight of an olefin/alkyl ester of unsaturated carboxylic acid copolymer containing b mole % of an alkyl ester of unsaturated carboxylic acid and c mole % of other polar monomer, and (2) A parts by weight of an ethylene/vinyl acetate copolymer containing a mole % of a vinyl acetate and c' mole % of other polar monomer, the resin composition satisfying the following formula, $$(A)/(B)=5/95 \text{ to } 95/5,$$

a P-value defined by the following formula, $$P=bB/(bB+aA)$$

lying in a range of from 0.01 to 0.99 and, preferably, from 0.05 to 0.95, and a Q-value defined by the following formula, $$Q=(cB+c'A)/100$$

lying in a range of from 0.01 to 49 and, preferably, from 0.1 to 25.

Here, either c or c' may be 0 as pointed out already.

The P-value has the same meaning as the X-value, and the Q-value has the same meaning as the Y-value. When these values are too small, the flame-retarding property becomes poor and good shell-forming property is not obtained when burned, either. When these values are too large, on the other hand, the resin strength decreases and the flame-retarding property becomes poor. It is therefore desired that the two values lie within the above ranges.

[Flame-retardant Inorganic Compound]

As the flame-retardant inorganic compound to be used in combination with the resins, there can be exemplified an inorganic compound that imparts flame-retardant properties to the resins, such as a hydroxide-type or oxide-type inorganic flame-retarding agent, a borate-type flame-retarding agent, a stannate-type flame-retarding agent and an antimony-type flame-retarding agent, which may be used alone or in a combination of two or more kinds.

As the hydroxide-type or oxide-type flame-retarding agent, there can be exemplified aluminum hydroxide, magnesium hydroxide, basic magnesium carbonate, and hydrotalcite-type complex metal hydroxide or dried or fired product thereof.

As the borate-type flame-retarding agent, there can be used zinc borate or barium metaborate.

As the stannate-type flame-retarding agent, there can be used zinc stannate and zinc hydroxystannate.

As the antimony-type flame-retarding agent, there can be used antimony trioxide, antimony pentoxide and sodium antimonate.

As the flame-retardant inorganic compound, a hydroxide-type flame-retarding agent and, particularly, magnesium oxide can be used to fulfil the object of the invention.

From the standpoint of the blend of the flame-retardant inorganic compound and the appearance of the molded article obtained from the flame-retardant resin composition, it is desired that the inorganic compound has an average particle diameter of from about 0.05 to about 20 $\mu$m and, particularly, from about 0.1 to about 5 $\mu$m. Because of the same reason, further, it is desired to use the inorganic compound of which the surfaces have been treated with a fatty acid, a fatty acid amide, a fatty acid salt, a fatty acid ester, an aliphatic alcohol, a silane coupling agent, a titanium coupling agent, a silicone oil or a phosphoric acid ester.

In the present invention, the above inorganic flame-retarding agent can, as desired, be used in combination with an organic flame-retarding agent, such as halogen-type flame-retarding agent, red phosphorus, ammonium polyphosphate, phosphoric acid ester-type flame-retarding agent or halogenated phosphoric acid ester.

Further, the flame-retardant inorganic compound can be used in combination with a filler for assisting the flame-retarding property, such as silica, alumina, calcium carbonate, talc, clay, zeolite, carbon black or glass fiber.

Carbon black and red phosphorus are not essential components. When these components are not contained, therefore, the composition can be favorably colored.

[Flame-retardant Resin Composition]

The flame-retardant inorganic compound is blended in an amount of from 25 to 250 parts by weight, preferably, from 50 to 200 parts by weight and, more preferably, from 70 to 150 parts by weight per 100 parts by weight of the total amount of the polymer components, such as (A) the ethylene/vinyl acetate copolymer, (B) the ethylene/alkyl ester of unsaturated carboxylic acid copolymer and (C) other thermoplastic resin.

When the blending amount of the flame-retardant inorganic compound is too small, it is difficult to impart the flame-retarding property to a sufficient degree. When the blending amount is too large, on the other hand, it becomes difficult to obtain a composition that can be favorably processed.

The flame-retardant resin composition of the present invention can be blended with other polymers in a range in which they do not hinder the object of the present invention. As required, further, various additives can be added. Examples of the additives include antioxidant, photo-stabilizer, ultraviolet ray-absorbing agent, flame-retarding assistant, pigment, dye, lubricant, anti-blocking agent, foaming agent, foaming aid, crosslinking agent, crosslinking aid, etc.

The flame-retardant resin composition of the present invention is obtained by melt-kneading the above-mentioned components in a kneader that has been known per se. such as Bumbury's mixer, pressurized kneader, mono-axial extruder, biaxial extruder or roll, and is, as required, pelletized and is, then, molded into a flame-retardant molded resin article through molding/working means that meets the object, such as extrusion molding, injection molding, compression molding, hollow molding or foam molding. The flame-retardant resin molded article can further be crosslinked by the irradiation with electron rays.

EXAMPLES

The invention will now be described by way of Examples which are only descriptive of the preferred embodiment of the invention but are in no way to limit the invention.

Described below are the starting resins, inorganic compounds, additives used in Examples and Comparative Examples, and methods of testing properties of the obtained polymer compositions. The monomer compositions having a final symbol W are on the weight basis, and the monomer compositions having a final symbol M are on the molar basis. The blending ratios of the compositions in Table are on the weight basis.

1. Starting Materials.

(1) Ethylene/vinyl acetate copolymers

| Designation | Copolymer composition | MFR |
|---|---|---|
| EVA-1 | ethylene/vinyl acetate = 81/19W | 2.5 |
| EVA-2 | ethylene/vinyl acetate = 75/25W | 2 |
| EVA-3 | ethylene/vinyl acetate = 88/12W | 0.4 |
| EVA-4 | ethylene/vinyl acetate = 83/17W | 0.8 |
| EVA-5 | ethylene/vinyl acetate = 81/19W | 150 |
| EVA-6 | ethylene/vinyl acetate = 93.7/6.3M | 0.8 |
| EVA-7 | ethylene/vinyl acetate/carbon monoxide = 78.8/9.3/11.9M | 30 |
| EVA-8 | ethylene/vinyl acetate/glycidyl methacrylate = 95/3/2M | 3.0 |
| EVA-9 | acid-modified product of a partly saponified product of ethylene/vinyl acetate copolymer (Demulan C1591, manufactured by Takeda Yakuhin Co.) | 8 |
| EVA-10 | ethylene/vinyl acetate/vinyl alcohol = 77/1.1/21.9M | 15 |
| EVA-11 | ethylene/vinyl acetate = 86.2/13.8M | 1.0 |

(2) Olefin/unsaturated carboxylic acid ester copolymers

| Designation | Copolymer composition | MFR |
|---|---|---|
| EEA-1 | ethylene/ethyl acrylate = 85/15W | 0.5 |
| EEA-2 | ethylene/ethyl acrylate = 91/9W | 0.5 |
| EEA-3 | ethylene/ethyl acrylate = 91/9W | 5 |
| EEA-4 | ethylene/butyl acrylate/carbon monoxide = 80.3/7.8/11.9M | 8 |
| EEA-5 | ethylene/methyl acrylate = 61.3/38.7M | 2 |
| EEA-6 | ethylene/methyl acrylate/monomethyl maleate = 64.5/34/1.5M | 11 |
| EEA-7 | ethylene/butyl acrylate/glycidyl methacrylate = 90.3/8.3/1.4M | 12 |
| EEA-8 | ethylene/ethyl acrylate/maleic anhydride = 85.4/14.3/0.3M | 8 |
| EEA-9 | ethylene/ethyl acrylate = 95.3/4.7M | 0.5 |
| EEA-10 | acrylonitrile/methyl acrylate/-butadiene = 85/19/5M | 0.4 |
| EEA-11 | ethylene/i-butyl acrylate/-methacrylic acid = 80/10/10W | 10 |
| EEA-12 | ethylene/product modified with 1% by weight of maleic anhydride of ethyl acrylate = 66/34W | 0.8 |

(3) Other thermoplastic resins

| Designation | Copolymer composition | MFR |
|---|---|---|
| TP-1 | ethylene/methacrylic acid (= 88/12W) copolymer | 7 |
| TP-2 | product modified with 1% by weight of maleic anhydride of ethylene/octene copolymer | 0.8 |
| TP-3 | linear low-density polyethylene stemming from a metallocene catalyst, density = 916 kg/m$^3$ | 1.5 |
| TP-4 | ethylene/vinyl alcohol (= 68/32M) copolymer | 1.3 |
| TP-5 | SEBS EB/styrene (= 82/18M) copolymer | 1* |
| TP-6 | ethylene/glycidyl methacrylate (= 97/3M) copolymer | 3.0 |
| TP-7 | ethylene/4-methyl-1-pentene copolymer | 2.1 |

*Measured at 230° C.

(4) Flame-retarding inorganic compounds.

| | |
|---|---|
| Inorganic compound 1: | magnesium hydroxide (synthesized product), average diameter, 0.8 μm |
| Inorganic compound 2: | magnesium hydroxide (synthesized product), average diameter, 2.2 μm |
| Inorganic compound 3: | magnesium hydroxide (natural product), average diameter, 3.5 μm |
| Inorganic compound 4: | magnesium hydroxide/nickel hydroxide (synthesized product), average diameter, 0.7 μm |

(5) Other additives.

Antioxidant [trade name: Irganox 1010](manufactured by Chiba Specialty Chemicals Co.)

2. Methods of Testing Properties of the Polymer Compositions.

(1) Oxygen index: In compliance with JIS K7201
An oxygen index was measured as an index of flame-retarding property.

(2) Shell formation: Burning state of the sample at the time of measuring the oxygen index was observed by eyes, and evaluated on the basis of the following criteria.
◯: Shell is formed, or shell is strong.
Δ: Shell is poorly formed though it does not drip.
X: Melts and flows down (drips).

(3) Taper wear: In compliance with JIS K7204
The taper wear was measured as an index of abrasion resistance.

(4) Heat resistance: A sheet sample was left in an oven maintained at a predetermined temperature, a change in the appearance after 48 hours was observed by eyes and was evaluated on the basis of the following criteria.
⊚: No change in the appearance (at an oven temperature of 100° C.).
◯: No change in the appearance (at an oven temperature of 90° C.).
X: Appearance has changed (at an oven temperature of 90° C.).

(5) Melt flow rate (MFR): In compliance with JIS K6760
Resin temperature: 190° C., load: 2160 g (6) Moldability: The moldability was evaluated on the basis of the following criteria by observing the stranded state at the time of measuring MFR by eyes.
◯: The skin of strand is smooth.
Δ: The skin of the strand is coarse to some extent.
X: The skin of the strand is coarse to a conspicuous degree.

(7) Brittle temperature: In compliance with JIS K7216
The brittle temperature was measured as an index of low-temperature characteristics.

(8) UL94:
Evaluated in compliance with the testing method under UL94 as an index of flame-retardant property.
Sample thickness (1 mm).

(9) X-value=(bB+eC)/(bB+eC+aA+dC+hD)
Y-Value=(cB+fC+gD+iE)/100
A: amount (parts by weight) of the ethylene/vinyl acetate copolymer.
a: content (mole %) of the vinyl acetate in the copolymer.
B: amount (parts by weight) of the ethylene/alkyl ester of unsaturated carboxylic acid copolymer.
b: content (mole %) of the alkyl ester of unsaturated carboxylic acid in the above copolymer.
c: content (mole %) of the polar monomer in the above copolymer.
D: amount (parts by weight) of the ethylene/polar monomer copolymer.
g: content (mole %) of the polar monomer in the above copolymer.
h: content (mole %) of the vinyl acetate in the above copolymer.
E: amount (parts by weight) of the aromatic group-containing copolymer.
i: content (mole %) of the aromatic group-containing monomer in the above copolymer.

(10) P-value=bB/(bB+aA)
Q-value=(cB+c'A)/100
B: amount (parts by weight) of the olefin/alkyl ester of unsaturated carboxylic acid copolymer.
b: content (mole %) of the alkyl ester of unsaturated carboxylic acid in the above copolymer.

c: content (mole %) of other polar monomer in the above copolymer.

A: amount (parts by weight) of the ethylene/vinyl acetate copolymer.

a: content (mole %) of the vinyl acetate in the above copolymer.

c': content (mole %) of other polar monomer in the above copolymer.

Examples 1 and 2

Starting materials (EVA-1 and EEA-1 in Example 1, and EVA-4 and EEA-1 in Example 2) were blended at blending ratios shown in Table 1, heated and kneaded in a small pressurized kneader, thrown into a 6-inch roll and were roll-kneaded to prepare polymer compositions.

The compositions were examined for their workabilities (MFR and appearance of the strand at the time of measuring MFR), were press-molded to prepare sheets having thicknesses of 1 mm and 3 mm, measured for their oxygen indexes and shell formation to evaluate their flame-retardant properties. The compositions were further measured for their taper wear to evaluate their abrasion resistance. The results were as shown in Table 1.

As will be obvious from the results of Table 1, the polymer compositions of the present invention obtained in Examples exhibited high oxygen indexes and firm shells as compared with the conventional flame-retardant resin compositions despite of adding the flame-retarding agent in an equal amount. The polymer compositions of the invention also exhibited excellent abrasion resistance and moldability.

From the results of Table 1, it will be understood that the compositions blended with copolymers having an acid group exhibit further improved flame-retardant property.

Example 6

The samples were prepared and evaluated in the same manner as in Example 1 but using EVA-2 and EVA-3 instead of EVA-1 of Example 1 and, further, blending the thermoplastic polymer TP-3.

The results were as shown in Table 1.

It will be understood from Table 1 that the compositions blended with the thermoplastic polymer exhibit not only excellent flame-retarding property and abrasion resistance but also excellent heat resistance. It will further be understood that an enhanced efficiency is obtained by using both EVA and EEA, and by using two or more copolymers having different VA or EA content.

Examples 7 to 15

Flame-retardant resin compositions were prepared and were measured for their properties in the same manner as in Example 1 but changing the kinds and combinations of the copolymers (A) and (B) as shown in Table 2.

The results were as shown in Table 2.

The results of Table 2 show that the resin compositions favorably form shells and exhibit excellent flame-retardant property despite the compositions are rich in EVA (Examples 7 to 9); the resin composition forms shells and exhibits very good flame-retardant property despite the EA content is small (Example 10); the resin composition-forms

TABLE 1

|  | Example 1 | Example 2 | Example 3 | Example 4 | Example 5 | Example 6 | Comparative Example 1 | Comparative Example 2 |
| --- | --- | --- | --- | --- | --- | --- | --- | --- |
| EVA-1 | 40 |  | 36 | 36 | 36 |  | 100 |  |
| EVA-2 |  |  |  |  |  | 25 |  |  |
| EVA-3 |  |  |  |  |  | 10 |  |  |
| EVA-4 |  | 60 |  |  |  |  |  |  |
| EEA-1 | 60 | 40 | 54 | 54 | 54 | 40 |  | 100 |
| TP-1 |  |  |  | 10 |  |  |  |  |
| EEA-11 |  |  |  |  | 10 |  |  |  |
| EVA-9 |  |  | 10 |  |  |  |  |  |
| TP-3 |  |  |  |  |  | 25 |  |  |
| Inorganic compound 1 | 100 | 100 | 100 | 100 | 100 | 100 | 100 | 100 |
| Irganox 1010 | 0.2 | 0.2 | 0.2 | 0.2 | 0.2 | 0.2 | 0.2 | 0.2 |
| Oxygen index | 27.5 | 29.5 | 30 | 29 | 29 | 27 | 23 | 25 |
| Shell formation | ○ | ○ | ○ | ○ | ○ | ○ | x | Δ |
| Taper wear (mg/1000 times) | 130 | 90 | 130 | 120 | 140 | 120 | >200 | >200 |
| Heat resistance | ○ | ○ | ○ | ○ | ○ | ⊚ | x | ○ |
| MFR (g/10 min) | 0.5 | 0.3 | 0.5 | 0.2 | 0.2 | 0.6 | 1.2 | 0.2 |
| Moldability | ○ | ○ | ○ | ○ | ○ | ○ | ○ | ○ |

Examples 3 to 5

In Example 1, copolymers having an acid group (EVA-9 in Example 3, TP-1 in Example 4 and EEA-12 in Example 5) were further blended, and the samples were prepared and evaluated in the same manner as in Example 1.

shells and exhibits very good flame-retardant property despite the MFR is high (Example 11); the resin compositions form sheets and exhibit high flame-retardant property despite the flame-retarding agent is blended in small amounts (Examples 12 and 13); use of an acid-modified product as part of EVA or EEA is effective in forming shells, in imparting flame-retardant property and in the moldability (Example 15).

TABLE 2

|  | Ex. 7 | Ex. 8 | Ex. 9 | Ex. 10 | Ex. 11 | Ex. 12 | Ex. 13 | Ex. 14 | Ex. 15 | Comp. Ex. 3 | Comp. Ex. 4 |
|---|---|---|---|---|---|---|---|---|---|---|---|
| EVA-2 |  |  |  |  |  |  |  | 40 |  |  |  |
| EVA-4 | 70 | 90 | 95 | 60 | 60 | 60 | 60 |  | 90 |  | 90 |
| EVA-5 |  |  |  |  |  |  |  |  |  | 90 |  |
| EEA-1 | 30 | 10 | 5 |  |  | 40 | 40 | 60 |  | 10 |  |
| EEA-2 |  |  |  | 40 |  |  |  |  |  |  |  |
| EEA-3 |  |  |  |  | 40 |  |  |  |  |  |  |
| EEA-11 |  |  |  |  |  |  |  |  | 10 |  |  |
| TP-2 |  |  |  |  |  |  |  |  |  |  | 10 |
| Inorganic compound 1 | 100 | 100 | 100 | 100 | 100 | 50 | 75 | 100 | 100 | 100 | 100 |
| Irganox 1010 | 0.2 | 0.2 | 0.2 | 0.2 | 0.2 | 0.2 | 0.2 | 0.2 | 0.2 | 0.2 | 0.2 |
| Oxygen index | 27 | 26.5 | 27 | 29.5 | 29 | 26 | 27 | 28 | 29 | 26 | 28 |
| Shell formation | ○ | ○ | ○ | ○ | ○ | ○ | ○ | ○ | ○ | Δ | x |
| Taper wear (mg/1000 times) | 87 | 92 | 90 | 98 | 120 | 56 | 84 | 99 | 78 | 110 | 96 |
| Heat resistance | ○ | ○ | ○ | ○ | ○ | ○ | ○ | ○ | ○ | x | ○ |
| MFR (g/10 min) | 0.4 | 0.4 | 0.4 | 0.4 | 0.8 | 0.6 | 0.4 | 0.4 | 0.3 | 44 | 0.2 |
| Moldability | ○ | ○ | ○ | ○ | ○ | ○ | ○ | ○ | ○ | ○ | ○ |

Comparative Examples 1 to 4

Starting materials were blended at blending ratios shown in Tables 1 and 2 to prepare conventional flame-retardant resin compositions in the same manner as in Example 1 and to measure their properties.

The results were as shown in Tables 1 and 2.

The results of Table 1 tell that when either the ethylene/vinyl acetate copolymer or the ethylene/unsaturated carboxylic acid ester copolymer is used (Comparative Examples 1 and 2), the oxygen indexes are low and the abrasion resistance is not sufficient as compared with those of Examples 1 to 6.

The resin composition of Comparative Example 1 did not form shell, and developed vigorous dripping phenomenon.

The results of Table 2 show that the EVA of Comparative Example 3 having an MFR higher than that specified by the present invention, is capable of only weakly forming shells and has a problem concerning the heat resistance.

The resin composition of Comparative Example 4 is not capable of forming shells despite the EVA or the EEA is blended with an acid-modified product which is not a base resin.

Examples 16 to 20

90 Parts by weight of the ethylene/vinyl acetate copolymer (EVA-6) and 10 parts by weight of the ethylene/unsaturated carboxylic acid ester copolymer (EEA-4 in Example 16, EEA-5 in Example 17, EEA-6 in Example 18, EEA-7 in Example 19, EEA-8 in Example 20) shown in Table 3 were blended with 100 parts by weight of magnesium hydroxide and 0.2 parts by weight of an antioxidant (trade name: Irganox 1010 manufactured by Chiba Specialty Chemicals Co.) as shown in Table 3. The mixture was then heated and kneaded in a small pressurized kneader, thrown into a 6-inch roll, and was roll-kneaded to prepare resin compositions. After roll-kneaded, a mixed compound sheet was prepared and was further subjected to the press-molding to prepare sheets having thicknesses of 1 mm and 3 mm to evaluate their tensile properties, flame-retardant properties (oxygen index, shell formation) and moldability. The results were as shown in Table 3.

TABLE 3

|  | Example | | | | | | | | Comparative Example | | | |
|---|---|---|---|---|---|---|---|---|---|---|---|---|
|  | 16 | 17 | 18 | 19 | 20 | 21 | 22 | 23 | 5 | 6 | 7 | 8 |
| EVA-6 | 90 | 90 | 90 | 90 | 90 | 40 | 40 | 40 | 100 | 90 |  |  |
| EEA-4 | 10 |  |  |  |  |  |  |  |  |  |  | 100 |
| EVA-7 |  |  |  |  |  |  |  |  |  | 10 |  |  |
| EEA-5 |  | 10 |  |  |  |  |  |  |  |  |  |  |
| EEA-6 |  |  | 10 |  |  |  |  |  |  |  |  |  |
| EEA-7 |  |  |  | 10 |  |  |  |  |  |  |  |  |
| EEA-8 |  |  |  |  | 10 |  |  |  |  |  |  |  |
| EEA-9 |  |  |  |  |  | 40 | 40 | 40 |  |  | 100 |  |
| EVA-10 |  |  |  |  |  | 20 |  |  |  |  |  |  |
| TP-4 |  |  |  |  |  |  | 20 |  |  |  |  |  |
| TP-5 |  |  |  |  |  |  |  | 20 |  |  |  |  |
| Inorganic compound 1 | 100 | 100 | 100 | 100 | 100 | 100 | 100 | 100 | 100 | 100 | 100 | 100 |
| Irganox 1010 | 0.2 | 0.2 | 0.2 | 0.2 | 0.2 | 0.2 | 0.2 | 0.2 | 0.2 | 0.2 | 0.2 | 0.2 |
| X-value | 0.13 | 0.41 | 0.37 | 0.13 | 0.2 | 0.43 | 0.43 | 0.43 | 0 | 0 | 1 | 1 |
| Y-value | 1.2 | 0 | 0.2 | 0.1 | 0.03 | 4.4 | 11.5 | 3.6 | 0 | 1.2 | 0 | 12 |
| Oxygen index | 32.5 | 30 | 28 | 30.5 | 29 | 29 | 27.5 | 26.5 | 23.5 | 24 | 25 | 27.5 |
| Shell formation | ○ | ○ | ○ | ○ | ○ | ○ | ○ | ○ | x | x | Δ | ○ |

TABLE 3-continued

|  | Example | | | | | | | | Comparative Example | | | |
| --- | --- | --- | --- | --- | --- | --- | --- | --- | --- | --- | --- | --- |
|  | 16 | 17 | 18 | 19 | 20 | 21 | 22 | 23 | 5 | 6 | 7 | 8 |
| Strength at breaking point (Mpa) | 11.2 | 11 | 7.3 | 7.2 | 12.1 | 8.4 | 8.8 | 13.5 | 13.7 | 10.9 | 10.5 | 3.1 |
| Elongation (%) | 620 | 640 | 490 | 490 | 570 | 430 | 200 | 670 | 700 | 600 | 630 | 680 |
| MFR (g/10 min) | 0.3 | 0.2 | 0.2 | 0.3 | 0.3 | 0.3 | 0.4 | 0.2 | 0.4 | 0.2 | 0.2 | 1.7 |
| Moldability | ○ | ○ | ○ | ○ | ○ | ○ | ○ | ○ | ○ | ○ | ○ | ○ |

Examples 21 to 23

Sheets were prepared and tested in the same manner as in Example 16 but changing the copolymer compositions used in Examples 16 to 20 as shown in Table 3. The results were as shown in Table 3.

As will be obvious from the results of Table 3, the flame-retardant resin compositions of the present invention obtained in Examples exhibit high flame-retarding properties and shell-forming properties maintaining well-balanced moldability, toughness and ductility that could not be accomplished with the conventional polyolefin resins.

Comparative Example 5

A sample was prepared and evaluated for its properties in the same manner as in Example 16 but using the ethylene/vinyl acetate copolymer (EVA-6) only as the resin component. As shown in Table 3, the sample exhibited low flame-retarding property and very poorly formed the shell.

Comparative Example 6

A sample was prepared and evaluated for its properties in the same manner as in Example 16 but using EVA-7 instead of EEA-4. As shown in Table 3, the shell was poorly formed and the flame-retarding property was low despite of the addition of the EVA-7 without functional group, such as an alkyl ester of unsaturated carboxylic acid, as the copolymer.

Comparative Example 7

A sample was prepared and evaluated for its properties in the same manner as in Example 16 but using the ethylene/ethyl acrylate copolymer EEA-13 only as the resin component. When the ethylene/ethyl acrylate copolymer only is used as shown in Table 3, the sample forms the shell but exhibits low flame-retardant property.

Comparative Example 8

A sample was prepared and evaluated for its properties in the same manner as in Example 16 but using the copolymer EEA-4 only as the resin component. When the copolymer EEA-4 only is used as shown in Table 3, the sample exhibits good shell formation and flame-retardant property. The flame-retardant property, however, is considerably lower than that of Example 16 that also uses EVA. Besides, the resin strength is very low and is not practicable.

Examples 24 to 28

100 Parts by weight of a starting resin of a blend as shown in Table 4 was blended with 100 parts by weight of magnesium hydroxide (50 parts by weight only in Example 25) and 0.2 parts by weight of an antioxidant (trade name: Irganox 1010 manufactured by Chiba Specialty Chemicals Co.). The mixture was then heated and kneaded in a small pressurized kneader, thrown into a 6-inch roll, and was rolled-kneaded therein to prepare resin compositions. After rolled-kneaded, a mixed compound sheet was prepared and was further subjected to the press-molding to prepare sheets having thicknesses of 1 mm and 3 mm to evaluate their tensile properties, flame-retardant properties (oxygen index, shell formation) and moldability. The results were as shown in Table 4.

TABLE 4

|  | Example | | | | | Comparative Example | | | |
| --- | --- | --- | --- | --- | --- | --- | --- | --- | --- |
|  | 24 | 25 | 26 | 27 | 28 | 9 | 10 | 11 | 12 |
| EEA-9 | 90 | 60 | 90 |  |  | 100 |  |  |  |
| EEA-5 |  |  |  | 90 |  |  |  |  |  |
| EEA-10 |  |  |  |  | 10 |  |  |  |  |
| EEA-4 |  |  |  |  |  |  |  |  | 100 |
| EVA-7 | 10 | 40 |  | 10 |  |  |  |  |  |
| EVA-8 |  |  | 10 |  |  |  |  |  |  |
| EVA-6 |  |  |  |  | 90 |  | 100 | 90 |  |
| TP-6 |  |  |  |  |  |  |  | 10 |  |
| Inorganic compound 1 | 100 | 50 | 100 | 100 | 100 | 100 | 1000 | 100 | 100 |
| Irganox 1010 | 0.2 | 0.2 | 0.2 | 0.2 | 0.2 | 0.2 | 0.2 | 0.2 | 0.2 |
| P-value | 0.82 | 0.43 | 0.93 | 0.97 | 0.15 | 1 | 0 | 0 | 1 |
| Q-value | 1.2 | 4.8 | 0.2 | 1.2 | 8.5 | 0 | 0 | 0.3 | 12 |
| Oxygen index | 27 | 24.5 | 28.5 | 29 | 32 | 25.5 | 23.5 | 25.5 | 27.5 |
| Shell formation | ○ | ○ | ○ | ○ | ○ | Δ | x | x | ○ |
| Strength at breaking point (Mpa) | 10.1 | 8.9 | 9.4 | * | 11.9 | 10.5 | 13.5 | 11.4 | 3.1 |

TABLE 4-continued

|  | Example | | | | | Comparative Example | | | |
| --- | --- | --- | --- | --- | --- | --- | --- | --- | --- |
|  | 24 | 25 | 26 | 27 | 28 | 9 | 10 | 11 | 12 |
| Elongation (%) | 620 | 600 | 430 | 1500 or more | 600 | 630 | 670 | 530 | 680 |
| MFR (g/10 min) | 0.3 | 0.6 | 0.2 | 1.6 | 0.4 | 0.2 | 0.4 | 0.3 | 1.7 |
| Moldability | ○ | ○ | ○ | ○ | ○ | ○ | ○ | ○ | ○ |

As will be obvious from the results of Table 4, the flame-retardant resin compositions of the present invention obtained in Examples exhibit good flame-retarding properties (oxygen index, shell-forming property), mechanical properties (strength, elongation) and moldability (MFR, appearance of strands) that could not be accomplished with the conventional polyolefin resins.

Comparative Example 9

A sample was prepared and evaluated for its properties in the same manner as in Example 28 but using the ethylene/vinyl acetate copolymer (EVA-9) only as the resin component. As shown in Table 3, the sample exhibited a low oxygen index.

Comparative Example 10

A sample was prepared and evaluated for its properties in the same manner as in Example 24 but using the EVA-6 only as the resin component. As shown in Table 3, flame-retardant properties (oxygen index, shell formation) of a sufficient degree were not obtained.

Comparative Example 11

A sample was prepared and evaluated for its properties in the same manner as in Example 28 but using a copolymer TP-6 without containing alkyl ester of unsaturated carboxylic acid, instead of EEA-10 to make a comparison with Example 28.

As shown in Table 4, the blend with TP-6 could not offer excellent results in the flame-retardant properties (oxygen index, shell formation) like those of Example 5.

Comparative Example 12

A sample was prepared and evaluated for its properties in the same manner as in Example 24 but using the EVA-4 only as the resin component. As shown in Table 4, relatively good flame-retardant properties were obtained, but the resin strength was very low and was not practicable.

Example 29

The same copolymer as that of Example 16 was further blended with a thermoplastic resin TP-7, and was evaluated. The blend composition and the evaluated results were as shown in Table 5. There was obtained a highly flame-retardant polymer composition exhibiting excellent heat resistance, anti-freezing property, workability and mechanical strength. An X-value was 0.13, and a Y-value was 1.0.

TABLE 5

|  | Example 29 |
| --- | --- |
| EVA-6 | 69 |
| EEA-4 | 8 |
| TP-7 | 23 |
| Inorganic compound 1 | 100 |
| Irganox 1010 | 0.2 |
| Oxygen index | 29 |
| Shell formation | ○ |
| Heat resistance | ⊙ |
| Strength at breaking point (Mpa) | 13.5 |
| Elongation (%) | 560 |
| MFR (g/10 min.) | 0.6 |
| Moldability | ○ |
| Brittle temperature (° C.) | −50 |

Example 30 and Comparative Example 13

Flame-retardant compositions shown in Table 6 were prepared in the same manner as in Example 16 and were evaluated. The results of evaluation were as shown in Table 6.

A comparison of Example 30 with Comparative Example 13 tells that an ultra-flame-retardant composition is not obtained when the EVA is used alone despite the flame-retardant inorganic compound is blended in large amounts. In Example 30, an X-value was 0.12 and a Y-value was 2.4.

TABLE 6

|  | Example 30 | Comp. Example 13 |
| --- | --- | --- |
| EVA-11 | 80 | 100 |
| EEA-4 | 20 |  |
| Inorganic compound 2 | 200 | 200 |
| Irganox 1010 | 0.2 | 0.2 |
| Oxygen index | >40 | >40 |
| Shell formation | ○ | ○ |
| UL94 (1 mm) | corres to V-0 | V-2OUT |
| MFR (g/10 min) | 0.2 | 0.1 |
| Moldability | ○ | ○ |

Example 31

The operation was conducted in the same manner as in Example 16 but replacing part of the flame-retardant inorganic compound used in Example 16 by ammonium polyphosphate. The blend composition and the evaluated results were as shown in Table 7. There was obtained a composition having flame-retardant properties like that of Example 16. The composition was white and could be easily colored.

TABLE 7

|  | Example 31 |
| --- | --- |
| EVA-6 | 90 |
| EEA-4 | 10 |
| Inorganic compound 1 | 95 |
| Ammonium polyphosphate | 5 |
| Irganox 1010 | 0.2 |
| Oxygen index | 35 |
| Shell formation | ○ |
| Strength at breaking point (Mpa) | 13.5 |
| Elongation (%) | 560 |
| MFR (g/10 min.) | 0.1 |
| Moldability | ○ |

Example 32

The operation was conducted in the same manner as in Example 2 by using a cheaply available synthetic magnesium hydroxide having a particle diameter which is more than two times as large as that of the magnesium hydroxide used in Example 2. The blend composition and the evaluated results were as shown in Table 8.

There was obtained a composition having good flame-retardant property, mechanical strength and moldability despite the magnesium hydroxide possessed a large particle diameter. Use of the cheaply available magnesium hydroxide makes it possible to provide a flame-retardant resin composition at a decreased cost.

Example 33

The operation and evaluation were effected in the same manner as in Example 32 by using a natural magnesium hydroxide which is a cheaply available flame-retardant inorganic compound. The blend composition and the evaluated results were as shown in Table 8.

A flame-retardant resin composition having good flame-retarding property, mechanical strength and moldability could be obtained very cheaply even by using the natural magnesium hydroxide that is available at a cost comparable to that of aluminum hydroxide.

Example 34

The operation and evaluation were conducted in the same manner as in Example 33 by using a flame-retardant inorganic compound containing magnesium hydroxide and nickel hydroxide. The blend composition and the evaluated results were as shown in Table 8.

A flame-retardant resin composition having good flame-retarding property, mechanical strength and moldability could be obtained even by using such a flame-retardant inorganic compound as nickel hydroxide.

TABLE 8

|  | Example 32 | Example 33 | Example 34 |
| --- | --- | --- | --- |
| EVA-4 | 60 | 60 | 60 |
| EEA-1 | 40 | 40 | 40 |
| Inorganic compound 2 | 100 |  |  |
| Inorganic compound 3 |  | 100 |  |
| Inorganic compound 4 |  |  | 100 |
| Irganox 1010 | 0.2 | 0.2 | 0.2 |
| Oxygen index | 27 | 25 | 27 |
| Shell formation | ○ | ○ | ○ |

TABLE 8-continued

|  | Example 32 | Example 33 | Example 34 |
| --- | --- | --- | --- |
| Strength at breaking point (MP) | 12.6 | 11.5 | 14.6 |
| Elongation (%) | 560 | 550 | 660 |
| MFR (g/10 min) | 0.3 | 0.3 | 0.3 |
| Moldability | ○ | ○ | ○ |

Industrial Applicability

According to the present invention, there is provided an olefin-type flame-retardant resin composition having excellent abrasion resistance and workability, maintaining mechanical strength inherent in the base polymer and exhibiting excellent shell-forming property when it has burned, despite the resin composition is blended with an inorganic compound.

Further, use of the cheaply available inorganic compound makes it possible to provide a flame-retardant resin composition at a decreased cost.

The olefin-type flame-retardant resin composition provided by the present invention exhibits excellent electric properties and can be favorably used for such applications as electric wire parts. Further, the flame-retardant resin composition can be molded into various articles that must exhibit flame-retardant properties by the above-mentioned various molding methods.

The molded articles can be used in the field of civil engineering, such as artificial lawn, mats, water shut-off sheets, tunnel sheets, roofing materials, in the field of pipes, such as horses, tubes, etc., in the field of home electric appliances, such as packings, vibration-damping sheets, etc., in the field of automobiles, such as backing material of carpet, water-proof sheet for door panels, mud guards, molds, etc., in the field of building materials, such as wall papers, furniture, floors, foamed sheets, etc., and in the field of cables, such as communication cables, power cables, wiring in the equipment, plugs, contraction tubes, etc.

What is claimed is:

1. A flame-retardant resin composition having 25 to 250 parts by weight of (D) a flame-retardant inorganic compound per 100 parts by weight of a base resin composition, comprising:

(A) a copolymer of an ethylene and a vinyl acetate and other polar group-containing monomer, (B) a copolymer of an olefin and an unsaturated carboxylic acid ester, as indispensable components, and (C) a thermoplastic resin other than the above (A) and (B) copolymers, as an optional component, wherein the copolymer (A) contains 20 to less than 98% by weight of an ethylene, 2 to less than 80% by weight of a vinyl acetate, and more than 0 to 40% by weight of the other polar group-containing monomer and said copolymer (A) has a melt flow rate (MFR), at 190° C. under a load of 2160 g, of from 0.1 to 100 g/10 minutes, and wherein the copolymer (B) contains 20 to 98% by weight of an olefin 2 to 80% by weight of an unsaturated carboxylic acid ester, and said copolymer (B) has a melt flow rate (MFR), at 190° C. under a load of 2160 g, of from 0.1 to 100 g/10 minutes, and wherein said base resin composition contains the copolymer (A) in an amount of from 95 to 5% by weight, the copolymer (B) in an amount of from 95 to 5% by weight and the thermoplastic resin (C) in an amount of up to 49% by weight, per total flame retardant resin composition.

2. A flame-retardant resin composition according to claim 1, wherein the other polar group-containing monomer in the copolymer (A) is an unsaturated carboxylic acid or a derivative thereof, carbon monoxide or a vinyl alcohol.

3. A flame-retardant resin composition according to claim 1, wherein the thermoplastic resin (C) is an ethylene-type polymer other than the copolymer (A) and the copolymer (B).

4. A flame-retardant resin composition according to claim 1, wherein the flame-retardant inorganic compound (D) is a magnesium hydroxide, an aluminum hydroxide, a hydrotalcite-type complex hydroxide, a basic magnesium carbonate or at least the one of the product thereof obtained by treating the surfaces with a fatty acid amide, a fatty acid salt, a fatty acid ester, a titanium coupling agent or a silane coupling agent.

5. A flame-retardant resin composition having 25 to 250 parts by weight of (D) a flame-retardant inorganic compound per 100 parts by weight of a base resin composition, comprising:

(A) a copolymer of an ethylene and a vinyl acetate, (B) a copolymer of an olefin and an unsaturated carboxylic acid ester and other polar group-containing monomer, as indispensable components, and (C) a thermoplastic resin other than the above (A) and (B) copolymers, as an optional component,
   wherein the copolymer (A) contains
      20 to 98% by weight of an ethylene,
      2 to 80% by weight of a vinyl acetate and said copolymer (A) has a melt flow rate (MFR), at 190° C. under a load of 2160 g, of from 0.1 to 100 g/10 minutes, and
   wherein the copolymer (B) contains
      20 to less than 98% by weight of an ethylene,
      2 to less than 80% by weight of an unsaturated carboxylic acid ester, and more than 0 to 60% by weight of the other polar group-containing monomer and said copolymer (B) has a melt flow rate (MFR), at 190° C. under a load of 2160 g, of from 0.1 to 100 g/10 minutes, and
wherein said base resin composition contains the copolymer (A) in an amount of from 95 to 5% by weight, the copolymer (B) in an amount of from 95 to 5% by weight and the thermoplastic resin (C) in an amount of up to 49% by weight, per total flame retardant resin composition.

6. A flame-retardant resin composition according to claim 5, wherein the other polar group-containing monomer in the copolymer (B) is an unsaturated carboxylic acid, an anhydride thereof, glycidyl ester thereof, a (meth)acrylonitrile or carbon monoxide.

7. A flame-retardant resin composition according to claim 5, wherein the copolymer (B) contains from 0.1 to 10% by weight of a butadiene, from 5 to 49.9% by weight of an unsaturated carboxylic acid ester, and from 40 to 94.9% by weight of a (meth)acrylonitrile.

8. A flame-retardant resin composition according to claim 5, wherein the thermoplastic resin (C) is an ethylene-type polymer other than the copolymer (A) and the copolymer (B).

9. A flame-retardant resin composition according to claim 5, wherein the flame-retardant inorganic compound (D) is a magnesium hydroxide, an aluminum hydroxide, a hydrotalcite-type complex hydroxide, a basic magnesium carbonate or at least the one of the product thereof obtained by treating the surface with a fatty acid amide, a fatty acid salt, a fatty acid ester, a titanium coupling agent or a silane coupling agent.

10. A flame-retardant resin composition having 25 to 250 parts by weight of (D) a flame-retardant inorganic compound per 100 parts by weight of a base resin composition, comprising:

(A) a copolymer of an ethylene and a vinyl acetate and other polar group-containing monomer, (B) a copolymer of an olefin and an unsaturated carboxylic acid ester and other polar group-containing monomer, as indispensable components, and (C) a thermoplastic resin other than the above (A) and (B) copolymers, as an optional component,
   wherein the copolymer (A) contains
      20 to less than 98% by weight of an ethylene,
      2 to less than 80% by weight of a vinyl acetate, and more than 0 to 40% by weight of the other polar group-containing monomer and said copolymer (A) has a melt flow rate (MFR), at 190° C. under a load of 2160 g, of from 0.1 to 100 g/10 minutes, and
   wherein the copolymer (B) contains
      20 to less than 98% by weight of an ethylene,
      2 to less than 80% by weight of an unsaturated carboxylic acid ester, and more than 0 to 60% by weight of the other polar group-containing monomer, and said copolymer (B) has a melt flow rate (MFR), at 190° C. under a load of 2160 g, of from 0.1 to 100 g/10 minutes, and
wherein said base resin composition contains the copolymer (A) in an amount of from 95 to 5% by weight, the copolymer (B) in an amount of from 95 to 5% by weight and the thermoplastic resin (C) in an amount of up to 49% by weight, per total flame retardant resin composition.

11. A flame-retardant resin composition according to claim 10, wherein the other polar group-containing monomer in the copolymer (A) is an unsaturated carboxylic acid or a derivative thereof, carbon monoxide or a vinyl alcohol.

12. A flame-retardant resin composition according to claim 10, wherein the other polar group-containing monomer in the copolymer (B) is an unsaturated carboxylic acid, an anhydride thereof, glycidyl ester thereof, a (meth) acrylonitrile or carbon monoxide.

13. A flame-retardant resin composition according to claim 10, wherein the copolymer (B) contains from 0.1 to 10% by weight of a butadiene, from 5 to 49.9% by weight of an unsaturated carboxylic acid ester, and from 40 to 94.9% by weight of a (meth)acrylonitrile.

14. A flame-retardant resin composition according to claim 10, wherein the thermoplastic resin (C) is an ethylene-type polymer other than the copolymer (A) and the copolymer (B).

15. A flame-retardant resin composition according to claim 10, wherein the flame-retardant inorganic compound (D) is a magnesium hydroxide, an aluminum hydroxide, a hydrotalcite-type complex hydroxide, a basic magnesium carbonate or at least the one of the product thereof obtained by treating the surfaces with a fatty acid amide, a fatty acid salt, a fatty acid ester, a titanium coupling agent or a silane coupling agent.

* * * * *